United States Patent
Kapteyn

(10) Patent No.: US 8,851,066 B1
(45) Date of Patent: Oct. 7, 2014

(54) THERMAL ENERGY STORAGE SYSTEM

(76) Inventor: Kelvin L. Kapteyn, Troy, MI (US)

( * ) Notice: Subject to any disclaimer, the term of this patent is extended or adjusted under 35 U.S.C. 154(b) by 1225 days.

(21) Appl. No.: 12/752,421

(22) Filed: Apr. 1, 2010

Related U.S. Application Data

(60) Provisional application No. 61/165,724, filed on Apr. 1, 2009.

(51) Int. Cl.
F24J 2/34 (2006.01)

(52) U.S. Cl.
USPC ............... 126/620; 126/643; 126/709

(58) Field of Classification Search
USPC ........ 126/48.2, 569, 617, 620, 634, 636, 643, 126/678, 709
See application file for complete search history.

(56) References Cited

U.S. PATENT DOCUMENTS

| | | | | |
|---|---|---|---|---|
| 3,236,294 A | * | 2/1966 | Thomason | 126/632 |
| 3,996,919 A | * | 12/1976 | Hepp | 126/636 |
| 4,010,731 A | * | 3/1977 | Harrison | 126/620 |
| 4,047,518 A | * | 9/1977 | Anderson | 126/646 |
| 4,059,093 A | * | 11/1977 | Knowles et al. | 126/636 |
| 4,091,622 A | * | 5/1978 | Marchesi | 126/634 |
| 4,114,600 A | * | 9/1978 | Newton | 126/643 |
| 4,116,222 A | * | 9/1978 | Seifried | 126/678 |
| 4,173,994 A | * | 11/1979 | Hiser | 126/643 |
| 4,184,477 A | * | 1/1980 | Yuan | 126/620 |
| 4,196,719 A | * | 4/1980 | Skrivseth | 126/620 |
| 4,222,365 A | * | 9/1980 | Thomson | 126/643 |
| 4,256,475 A | * | 3/1981 | Schafer | 165/140 |
| 4,280,480 A | * | 7/1981 | Raposo | 126/620 |
| 4,281,631 A | * | 8/1981 | Yamaguchi | 123/339.28 |
| 4,291,750 A | * | 9/1981 | Clyne et al. | 126/643 |
| 4,299,178 A | * | 11/1981 | Wilson | 126/620 |
| 4,299,277 A | * | 11/1981 | McGregor | 126/643 |
| 4,313,424 A | * | 2/1982 | Schreyer et al. | 126/636 |
| 4,378,908 A | * | 4/1983 | Wood | 126/613 |
| 4,392,531 A | | 7/1983 | Ippolito | |
| 4,445,499 A | | 5/1984 | Platell | |
| 4,452,229 A | * | 6/1984 | Powers | 126/643 |
| 4,456,056 A | | 6/1984 | Sills | |
| 4,469,086 A | * | 9/1984 | Ivorra | 126/617 |
| 4,471,759 A | | 9/1984 | Anderson et al. | |
| 4,491,172 A | * | 1/1985 | Hitchin | 126/643 |
| 4,537,180 A | * | 8/1985 | Minor | 126/709 |
| 4,602,676 A | | 7/1986 | Bergeron, Jr. | |
| 4,741,388 A | | 5/1988 | Kuroiwa | |
| 4,912,941 A | | 4/1990 | Büchi | |
| 4,976,308 A | | 12/1990 | Faghri | |
| 5,224,357 A | | 7/1993 | Galiyano et al. | |
| 5,477,703 A | | 12/1995 | Hanchar et al. | |
| 5,545,803 A | | 8/1996 | Heath et al. | |
| 5,601,382 A | | 2/1997 | Corte | |
| 5,630,447 A | | 5/1997 | Jensen | |
| 5,639,936 A | | 6/1997 | Corte | |
| 6,000,471 A | | 12/1999 | Langset | |
| 6,223,743 B1 | | 5/2001 | Prueitt | |
| 6,251,179 B1 | | 6/2001 | Allan | |

(Continued)

*Primary Examiner* — Craig Schneider
*Assistant Examiner* — Craig J Price
(74) *Attorney, Agent, or Firm* — Price Heneveld LLP

(57) ABSTRACT

A thermal energy storage system includes fluid conduits disposed in a loose solid material. The loose solid material may be disposed inside a waterproof barrier, and the fluid conduits may be configured to define a plurality of zones having different temperatures in operation. The system may include a solar collector or other source of heated oil or other fluid that is routed to the thermal energy storage unit and/or an energy-consuming facility.

37 Claims, 6 Drawing Sheets

(56) References Cited

U.S. PATENT DOCUMENTS

| | | |
|---|---|---|
| 6,374,614 B2 | 4/2002 | Prueitt |
| 7,082,779 B2 | 8/2006 | Xu |
| 7,178,337 B2 | 2/2007 | Pflanz |
| 7,234,314 B1 | 6/2007 | Wiggs |
| 7,472,548 B2 | 1/2009 | Meksvanh et al. |
| 7,617,697 B2 | 11/2009 | McCaughan |

\* cited by examiner

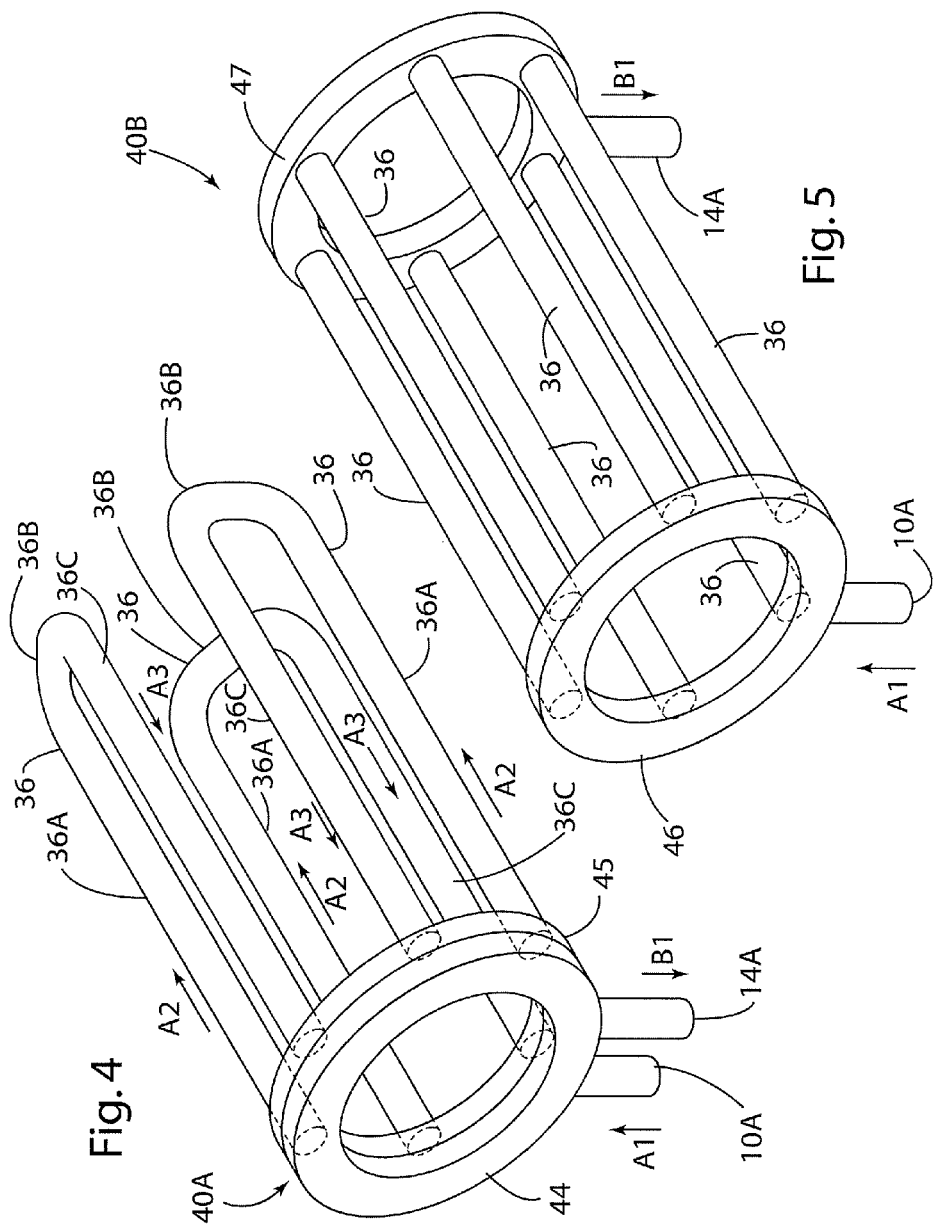

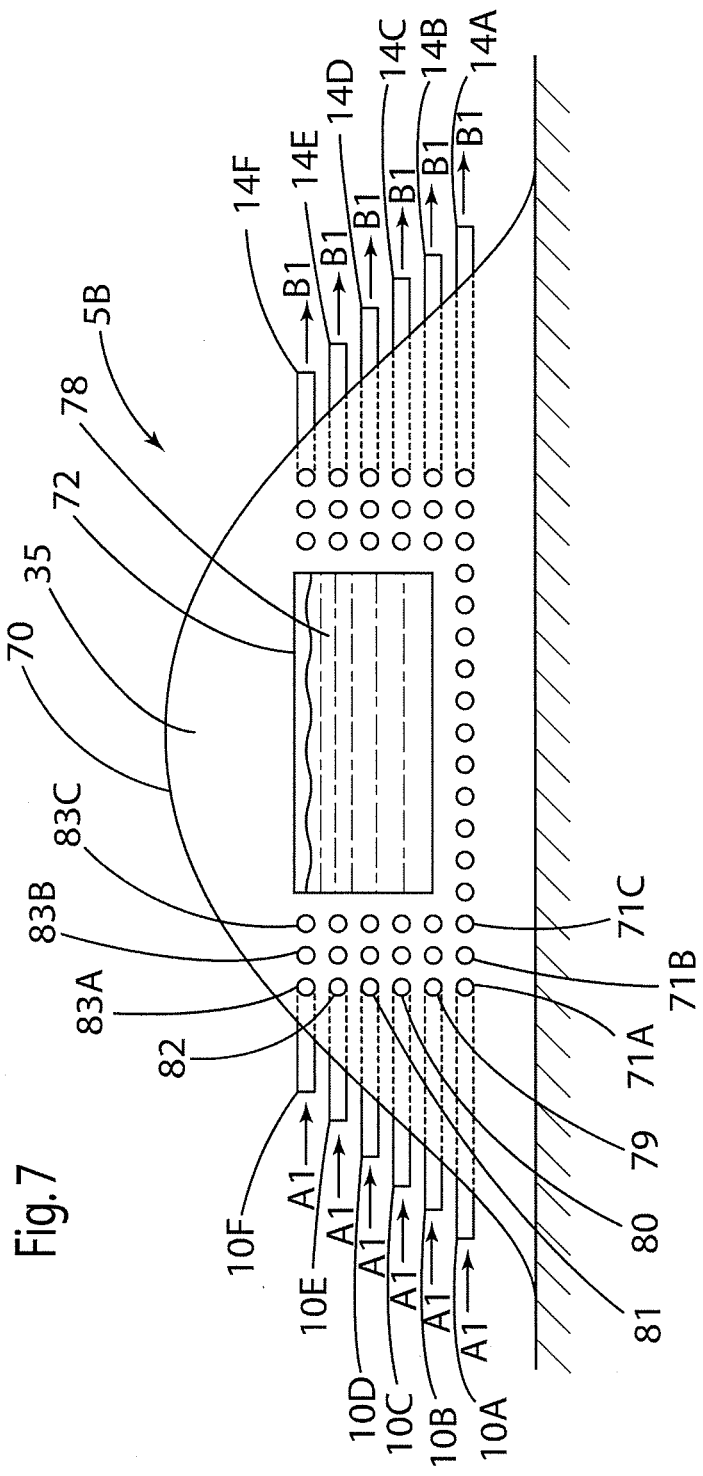

THERMAL ENERGY STORAGE SYSTEM

BACKGROUND OF THE INVENTION

Various types of systems for heating and/or cooling various facilities have been developed. One type of system utilizes heat collected from natural sources or excess heat produced as a byproduct of other processes. Such systems typically include a heat source such as solar collectors, a heat-using facility, and a thermal storage unit. The thermal storage unit can be utilized to compensate for time differences between peak thermal energy generation and thermal energy use requirements. For example, if solar energy is being utilized to heat buildings or the like, solar collectors may be utilized to collect heat. However, such collectors typically collect the most thermal energy during the day, whereas a building may need to be heated at night when the ambient air is colder. The thermal storage unit stores excess energy collected during periods of time during which thermal energy collection exceeds thermal energy use, and the stored thermal energy is drawn from the thermal energy storage unit during periods of time during which the thermal energy needs exceed thermal energy collection/production.

One type of thermal storage system utilizes hot oil that is stored in a large tank that may be surrounded by insulating material. During periods of time when the heat being collected exceeds the heat being used, the oil is heated by a solar collector or other heat source, and the hot oil is pumped into the tank. Cooler oil may be drawn from another portion of the tank that is generally remote from the hot oil inlet. The cooler oil is circulated through the solar collectors or other heat source, and the heated oil is then returned to the tank. During times when the amount of heat needed exceeds the amount of heat being generated, hot oil from the tank is pumped to a building or other facility that uses heat. The hot oil may pass through a heat exchanger where the heat is removed from the oil, and the cooled oil is then returned to the tank.

Another type of thermal storage system utilizes molten salt or a hybrid hot oil/molten salt system. Typically, a mixture of 60% sodium nitrate and 40% potassium nitrate is used. This mixture melts at a temperature of 429° to 430° F. The systems are typically kept at a minimum temperature of 550° F. on the cool side, and can be heated to 1100° F. or more. Such systems may include two tanks wherein a "cold" tank is held at 550° F. and a "hot" tank is kept as high as possible within the limitations of the equipment.

Another type of thermal storage system includes hot water tanks. Hot water from solar collectors or other source is pumped into the tanks, and the heated water is pumped from the tank at a later time when the thermal energy is needed. Such systems suffer from limitations. For example, such systems cannot be utilized to raise the temperature of the water above the boiling point unless the water is maintained at a high pressure. However, providing equipment capable of storing water at high pressures may be difficult, and it may raise safety concerns as well.

SUMMARY OF THE INVENTION

One aspect of the present invention is a thermal energy system including at least one source of thermal energy providing heated oil or other fluid at a first temperature that is substantially greater than an ambient air temperature. The thermal energy system also includes at least one energy-consuming unit/facility that consumes the thermal energy transported to it by the heated oil or other fluid. The system further includes at least one thermal energy storage unit or facility having a thermal mass that selectively receives and releases thermal energy that is transported to and from the thermal mass by the oil or other fluid. A fluid conduit system fluidly interconnects the source of thermal energy, the energy-consuming unit/facility and the thermal energy storage unit. The fluid conduit system fluidly interconnects the source of thermal energy, the energy-consuming unit/facility, and the thermal energy storage unit. The thermal energy control system also includes a control system configured to control flow of fluid through the fluid conduit system according to predefined criteria. The one thermal energy storage unit may include a waterproof barrier defining an interior space, and includes substantially loose solid material disposed in the interior space. At least one fluid conduit extends through the loose solid material to transfer thermal energy from oil flowing through the fluid conduit to the loose solid material. The loose solid material may comprise sand, gravel, dirt, or other low cost material that is readily available in the geographic region at which the thermal energy system is constructed. The thermal energy storage unit may include zones or volumes of thermal mass whereby the flow of oil or other fluid to each zone can be controlled. In use, the zones may operate at different temperatures to thereby increase the efficiency of the thermal storage unit. The source of thermal energy may comprise a solar collector, a geothermal facility, or other source of thermal energy. The system may include an auxiliary or backup heat source that utilizes combustion or other processes to generate heat from fuel during times in which the solar collectors or other sources of thermal energy do not provide sufficient thermal energy to meet the requirements of the energy-consuming unit or facility. The system may include an electrical power generation unit that utilizes steam from water that has been heated above the boiling temperature of water utilizing thermal energy transferred to the water. The energy-consuming unit or facility may comprise one or more buildings that are heated at night or during other periods of low ambient temperatures. The energy-consuming facility may also comprise a manufacturing facility or the like that utilizes thermal energy in connection with production processes or the like.

BRIEF DESCRIPTION OF THE DRAWINGS

FIG. 4 is an isometric view of a portion of the system of FIG. 3 according to one aspect of the present invention;

FIG. 5 is an isometric view of a portion of the system of FIG. 3 according to another aspect of the present invention;

FIG. 7 is a partially schematic cross-sectional view of a thermal energy storage system according to yet another aspect of the present invention.

DETAILED DESCRIPTION OF PREFERRED EMBODIMENT

Figure 3:
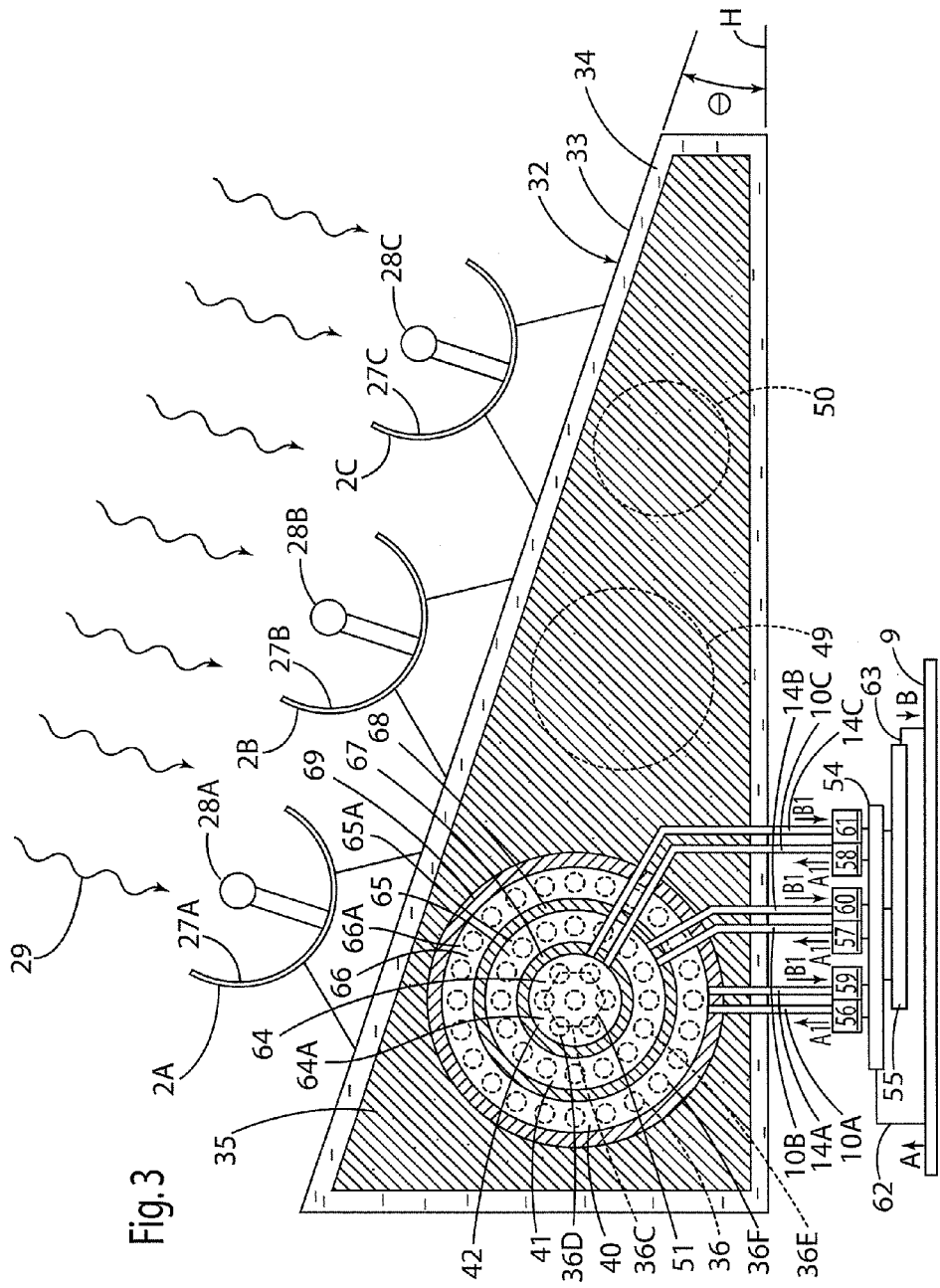
FIG. 3 is a cross-sectional view of a portion of the system of FIG. 2 taken along the line FIG. 2.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
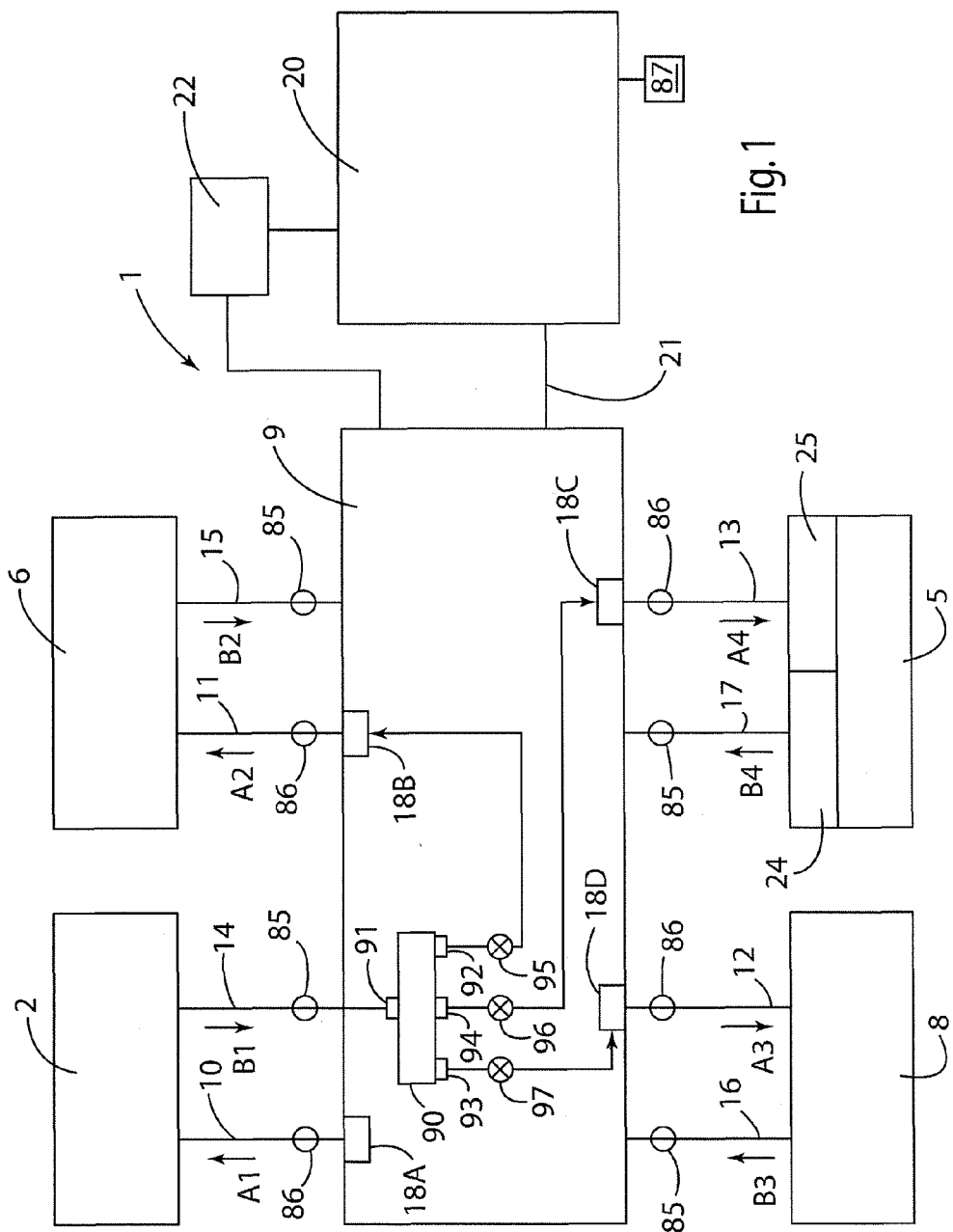
FIG. 1 is a schematic view of a thermal storage system according to one aspect of the present invention wherein the thermal storage system is operably interconnected with one or more heat sources and heat-using units.

With reference to FIG. 1, an energy production, storage, and utilization system 1 includes a source of thermal energy such as one or more solar collectors 2 that collect thermal energy from the sun, a thermal energy storage system or unit 5, and an energy-consuming facility or unit 6. Energy-consuming unit 6 may comprise one or more buildings that use thermal energy from source 2. The system 1 may also include an optional alternate or auxiliary heat source 8. The auxiliary heat source 8 may comprise a conventional heating unit utilizing natural gas, wood, oil, or other such fuel. In general, the auxiliary heat source 8 is capable of generating heat regardless of the ambient conditions. The system 1 also includes a valve unit 9 that is fluidly connected to the solar collector system 2, energy-using facility 6, auxiliary heat source 8, and thermal energy storage unit 5 by a plurality of outgoing pipes or other fluid lines or conduits 10-13, respectively, and a plurality of incoming pipes or lines 14-17, respectively. In general, the fluid pipes or lines 10-13 provide for fluid flow from the valve unit 9 to the solar collectors 2, energy-using facility 6, auxiliary heat source 8, and thermal energy storage unit 5 in the direction of the arrows A1-A4, respectively. Similarly, the fluid pipes or lines 14-17 provide for flow of fluid from the units 2, 5, 6, and 8 to the valve unit 9 in the direction of the arrows B1-B4. The fluid pipes or lines 10-17 are shown as being a single line in FIG. 1. However, it would be understood that each of the lines designated 10-17 may actually comprise a plurality of pipes or other fluid conduits as required for a particular application. The fluid or gas utilized in system 1 may comprise oil, water, steam, molten salt, or other suitable fluid.

As discussed in more detail below, the fluid of system 1 transfers thermal energy through the system 1 based on a predefined control scheme programmed into controller 20 to thereby provide for the energy needs of energy-using facility 6. For example, if energy-using facility 6 comprises one or more buildings that need to be heated at night, system 1 may be configured to collect thermal energy from solar collector system 2 during the day, directing some of the thermal energy to energy-using facility 6, while storing excess thermal energy in thermal energy storage unit 5. At night, system 1 may transfer stored thermal energy from thermal energy storage unit 5 to energy-using facility 6. Although system 1 may be configured to operate according to a twenty-four hour cycle, thermal energy storage unit 5 may also be configured to store thermal energy for longer periods as well. For example, in regions that experience cold winters, thermal energy storage unit 5 may receive and store large amounts of thermal energy during warmer summer months when the thermal energy use by facility 6 is significantly less than the thermal energy produced by solar collector system 2. Thermal energy can then be transferred from thermal energy storage unit 5 to energy-using facility 6 during winter months when energy-using facility 6 uses more thermal energy than is collected by solar energy collector system 2.

The valve unit 9 is connected to programmable controller 20 by an electrical line 21, a wireless router, or other communication device or line. As described in more detail below, the valve unit 9 is configured to provide for specific routing of fluid from and to each of the units 2, 5, 6, and 8 as required for a particular mode of operation. In general, the valve unit 9 comprises a plurality of valves that may be electrically-actuated to provide for flow of fluid in the specific manner required for operation at a given point in time. The valve unit 9 and controller 20 may be electrically connected to a source of electrical power 22. In general, the valve unit 9 may be configured to provide flow of fluid from any one of the units 2, 5, 6, and 8 to any other of the units 2, 5, 6, and 8, in any combination, as required for a particular application and/or mode of operation as described in more detail below. Valve unit 9 may include a plurality of electrically-powered pumps 18A-18D that are operably connected to controller 20 and electrical power source 22. It will be understood that a plurality of powered pumps may be positioned throughout system 1 as required to provide for proper flow of fluid.

Valve unit 9 may be specifically configured for a particular application, and it may include a plurality of electrically-actuated solenoid valves and fluid conduits that control the flow of fluid between units 2, 5, 6, and 8. Valve unit 9 may include a plurality of manifolds, wherein each manifold is fluidly connected to one inlet pipe 14-17, and each manifold is also fluidly connected to each outlet pipe 10-13, with an electrically-actuated valve controlling flow to each outlet pipe 10-13. For example, a manifold 90 (FIG. 1) has an inlet port 91 fluidly connected to outlet pipe 14 of solar collector system 2, and the inlet port 91 is fluidly connected to three outlet ports 92-94. A first outlet port 92 is fluidly connected to pipe 11, a second outlet port 93 is fluidly connected to pipe 12, and a third outlet port 94 is fluidly connected to pipe 13. Electrically-powered solenoid valves 95-97 control flow of fluid to each pipe 11-13 such that fluid from solar collector system 2 can be directed to one or more of the units 5, 6, and 8 by controller 20. Additionally, substantially similar manifolds (not shown) and powered valves (also not shown) may be fluidly connected to outlet pipes 15, 16, and 17 of units 6, 8, and 5, respectively. Controller 20 may be programmed to control valve unit 9 and thereby control flow of fluid to and from each unit 2, 5, 6, and 8 in the system as required.

Manifold 90 may further include an outlet port (not shown) that is fluidly connected to pipe 10 of solar collector system 2 to provide for recirculation of fluid within solar collector system 2. Similarly, manifolds (not shown) connected to units 5, 6, and 8 may also include an outlet port that provides for recirculation of fluid within the unit. In general, valve unit 9 may include fluid manifolds connected to each unit of the system, with each manifold having one input port fluidly connected to a specified number of outlet ports, wherein the specified number of outlet ports is equal to the number of units in the system, or wherein the specified number is equal to the number of units in the system minus one. Also, it will be understood that manifold 90 is an example of one suitable arrangement, but other fluid control schemes may also be utilized. For example, a manifold (not shown) having a single output port could be connected to pipe 10 of solar collector system 2. The manifold could include input ports connected to outlet pipes 15, 16, and 17 of units 6, 8, and 5, respectively. A single electrically-powered solenoid valve (not shown) could be fluidly connected to pipe 10 to control flow of fluid into solar collector system 2 from units 5, 6, and 8. As described in more detail below, thermal energy storage unit 5 may include additional valve units 24 and 25 to provide for additional control of fluid flow within the thermal energy storage unit 5.

Figure 2:
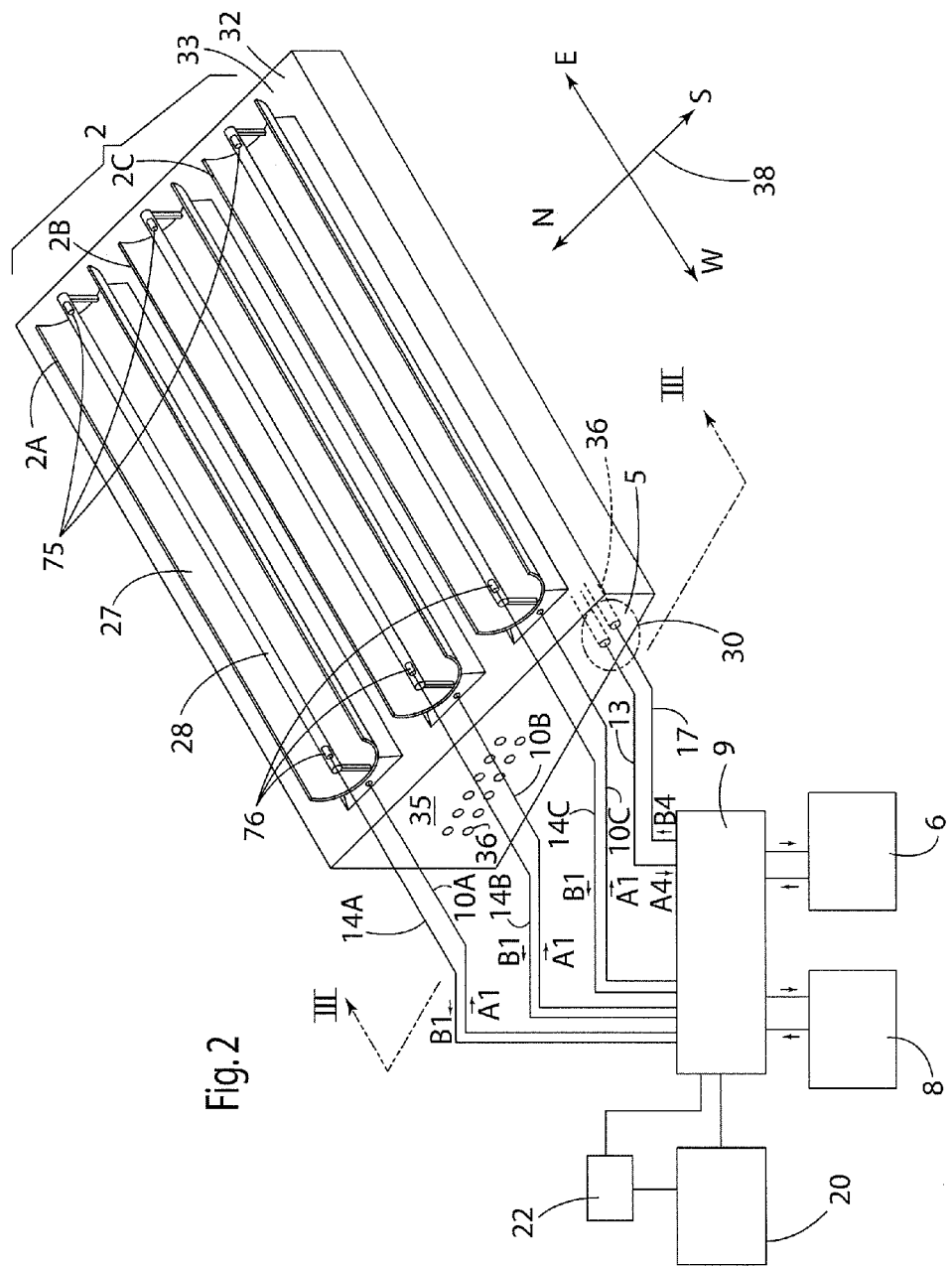
FIG. 2 is a partially schematic isometric view of a thermal energy storage system according to another aspect of the present invention wherein the heat source comprises one or more solar trough collectors.

With further reference to FIG. 2, solar collector system 2 may comprise a plurality of individual solar collectors 2A-2C. In general, the solar collectors 2A-2C each include a reflector 27 and an elongated fluid conduit 28 that is positioned at the focal point of the reflectors 27 to thereby heat fluid (e.g. oil) flowing through the conduit 28. The reflectors 27A-27C (FIG. 3) reflect thermal energy from the sun's rays 29 and concentrate the radiant energy onto the elongated conduits 28A-28C to thereby heat the fluid as it flows through the elongated conduits 28A-28C. Various types of solar collectors have been developed, and the solar collectors 2A-2C may be of a known design that is suitable for the requirements of a particular application. It will be understood that the number of solar collectors 2A-2C, as well as the size and configuration of the solar collectors 2A-2C will depend upon the requirements of a particular application. For example, solar collector system 2 may include ten, twenty, or more individual solar collectors if required for a particular application. A plurality of conduits or lines 10A-10C carry "cold" fluid from the valve unit 9 in the direction of the arrows A1 to the solar collectors 2A-2C, respectively, and a plurality of fluid pipes or conduits 14A-14C carry the "hot" fluid from the solar collectors 2A-2C, respectively, to the valve unit 9 in the direction of the arrows B1.

The solar collectors 2A-2C are positioned on a base 32 having upper surface 33 that may be positioned at an angle θ (FIG. 3) relative to a horizontal plane "H". In general, the solar collectors 2A-2C may be oriented with the axis (e.g. elongated conduit 28) of each collector 2A-2C oriented in an east-west direction or a north-south direction, and the angle θ can be selected to position the solar collectors 2A-2C such that they face the sun. For example, if the solar collectors 2A-2C are oriented as indicated by the north, south, east, and west arrows 38, and if the solar collectors 2A-2C are in the northern hemisphere, the angle θ may be chosen to position the solar collectors 2A-2C to face the sun. In general, the angle θ may be increased if the solar collectors 2A-2C are positioned further north of the equator to account for the sun being lower in the sky at increasing northern latitudes. Also, the upper surface 33 may be flat, or it may have a convex or concave curved shape in cross section (FIG. 3) if required for a particular application. Also, the angle and shape of the upper surface 33 may be selected to provide for drainage and/or to provide for other local conditions as required. Upper surface 33 may be substantially flush with the surface of the ground in the vicinity of base 32, or it may be elevated. For example, the surrounding earth may be at the same level as plane "H" (FIG. 3). It will be understood that solar collectors 2A-2C need not be positioned directly above the manifolds 40-42 and pipes 36. Also, base 32 could have alternate shapes. For example, thermal storage material 35 could be in the form of an elongated mound covering each set of pipes 36 and manifolds 40-42.

Base 32 may comprise thermal storage material 35 having a plurality of pipes or lines 36 disposed in the thermal storage material 35. The thermal storage material 35 may comprise dirt, earth, sand, gravel, clay, or other material capable of storing thermal energy. The material 35 is preferably a loose, pourable material that may be poured in place around the pipes or lines 36. Material 35 may be any number of low-cost materials available at or near the site of the system 1. For example, if system 1 is located on an island having readily-available volcanic rock or sand, material 35 may comprise volcanic rock or sand. If system 1 is located on an island having a ready supply of sand formed from coral, material 35 may comprise such sand. Material 35 may also comprise recycled material such as broken up pieces of concrete recovered from a demolition site. In general, material 35 may also comprise a mixture of materials. For example, material 35 may comprise a mixture of sand and gravel or a mixture of sand and clay. Mixture 35 may also comprise a mixture of inorganic material, such as sand or gravel, that has been mixed with organic material. Advantageously, material 35 may be almost any suitable low-cost material that is readily available in the geographic region where system 1 is installed. System 1 is therefore adaptable for a variety of geographic locations, without requiring transport of specialized thermal storage material from remote locations.

Referring to FIG. 3, the fluid pipes or lines 10A and 14A may be connected to a ring-shaped outer manifold 40. Pipes or lines 10B and 14B may be connected to a manifold 41 that is also ring-shaped, and the pipes or lines 10C and 14C may be connected to a center manifold 42 that is generally circular. The manifolds 40, 41, and 42 are fluidly connected to a plurality of fluid pipes or lines 36 that extend through the thermal storage material 35. With further reference to FIG. 4, manifold 40 may comprise a first type of manifold 40A having a first ring-shaped portion 44 that is fluidly connected to a fluid pipe or line 10A to provide for flow of fluid from pipe 10A to pipe sections 36A in the direction of the arrows A2. The fluid then flows around the U-shaped end portions 36B of pipes 36, and flows back in the direction of the arrows A3 along pipe sections 36C. The fluid then flows into a second ring-shaped manifold section 45 of manifold 40A, and out the pipe 14A as indicated by the arrow B1. If the fluid (e.g. oil or water) flowing from pipe 10A in a direction of arrow A1 is hot fluid, the heat from the fluid is transferred from the pipes 36 into the thermal storage material 35, such that the fluid exiting manifold 40A into pipe 14A as indicated by the arrow B1 is substantially cooler than the fluid entering manifold 40A from pipe 10A. Alternately, if the temperature of the thermal storage material 35 is substantially greater than the temperature of the fluid entering manifold 40A from pipe 10A, the fluid will be heated as it flows through the pipes 36 due to the transfer of thermal energy from the thermal storage material 35 to the fluid in the pipes 36, and the temperature of the fluid exiting manifold 40A to pipe 14A will be substantially greater than the temperature of fluid entering manifold 40A from pipe 10A. In the illustrated example, the manifold 40A is ring-shaped. However, the manifold 40A may be circular, or may have other shapes as required for a particular application. Thus, the manifolds 40, 41, and 42 and pipes 36 shown in FIG. 3 may each have substantially the same configuration as shown in FIG. 4.

Alternately, with reference to FIG. 5, a manifold 40B may include a first ring-shaped section 46 that is attached to the pipe section 10A, and a second ring-shaped portion 47 that is connected to the pipe 14A. A plurality of pipes 36 fluidly interconnect the manifold sections 46 and 47, and fluid flowing from pipe 10A in the direction of the arrow A1 flows through the ring 46, through pipes 36 into ring-shaped-manifold section 47, and out through pipe 14A in a direction of the arrow B1. If the fluid flowing in pipe 10A in the direction of the arrow A1 is hotter than the thermal storage material 35, the heat from the fluid will be transferred to the thermal storage material 35 as it flows through the pipes 36. Conversely, if the fluid flowing in the direction of the arrow A1 in pipe 10A is a lower temperature than the thermal storage material 35, heat from the thermal storage material 35 will be transferred into the fluid as it flows through the pipes 36, thereby heating the fluid such that the fluid flowing in the direction of the arrow B1 in pipe 14A is hotter than the fluid flowing in the direction of the arrow A1 in pipe 10A.

It will be understood that any of the manifolds 40, 41, and 42 (FIG. 3) may have the configuration shown in FIG. 4, the configuration shown in FIG. 5, or other suitable configuration. Referring again to FIG. 3, additional manifolds such as the manifolds 40, 41, and 42 may be positioned in the thermal storage material 35 as shown by the dashed circles 49 and 50. Also, manifolds 40, 41, and 42 need not have a circular configuration. For example, the manifolds could be oval, square, hexagonal, octagonal, or other configuration. In a preferred embodiment, the center manifold 42 includes a center pipe 36C, and six outer pipes that are equally spaced to form a ring-like hexagonal pattern 51. Pipes 36E are connected to ring manifold 41, and pipes 36F are connected to ring-shaped manifold 40. In a preferred embodiment, the pipes 36D, 36E, and 36F are configured such that the pipes 36 are equally spaced-apart to form hexagonal patterns relative to one another. According to one aspect of the present invention, pipes 36 comprise commercially available steel pipe having a nominal diameter of one inch, and the pipes 36 are spaced about one foot apart from each other. However, the pipes could be spaced further apart (e.g., two feet) and the pipes could be larger or smaller than one inch in diameter. Also, although pipes 36 may be made from steel, pipes 36 could be made of other materials having sufficient heat transfer capability, high temperature capability, and durability.

As discussed above, the thermal storage material 35 may comprise dirt, earth, sand, gravel, or other low-cost solid material capable of storing and releasing thermal energy. Base 32 may optionally be partially or fully encased in a layer of material 34 defining an interior space that receives thermal storage material 35. Layer 34 may comprise insulating foam or other material having low thermal conductivity. Also, layer 34 may be impermeable to water. Layer 34 may comprise a waterproof membrane or a layer of waterproof material that surrounds the thermal storage material 35 to prevent moisture from entering or escaping the thermal storage material 35. Vents (not shown) may be utilized to permit and control flow of air and water vapor from the space filled with material 35. Thermal storage material 35 is preferably substantially free of moisture to prevent escape of thermal energy in the form of water vapor or steam that could otherwise occur as thermal storage material 35 is heated. Although material 35 may contain a significant amount of moisture at the time unit 5 is constructed, most or all of the moisture escapes during initial heating of material 35, such that material 35 is substantially free of moisture during operation of system 1 following initial start-up. Also, because thermal storage material 35 is solid, significant convective heat transfer due to movement of mass within material 35 does not occur, with the possible exception of minor convective heat transfer due to movement of small amounts of moisture or other fluids or gasses dispose in thermal storage material 35. In general, the thermal mass (J/° C.) of thermal storage material 35 disposed inside layer 34 is much greater than the thermal mass of oil flowing in pipes 36 disposed inside layer 34. The thermal mass of the oil disposed inside layer 34 is preferably no more than about 10% of the thermal mass of the thermal storage material 35 disposed inside layer 34, and the thermal mass of the oil disposed inside layer 34 may be 1% or less than the thermal mass of the thermal storage material 35 disposed inside layer 34.

The volume or area 67 between the center manifold 42 and ring manifold 41 may optionally comprise insulating material forming a thermal barrier having generally cylindrical inner and outer surfaces. The thermal barrier reduces the rate of heat transfer between the thermal storage material 35 adjacent the pipes 36D and the thermal storage material 35 adjacent the pipes 36E. Similarly, the areas 68 between pipes 36E and 36F may also comprise insulating material having cylindrical inner and outer surfaces, and an additional layer of insulation 69 having generally cylindrical inner and outer surfaces may surround the pipes 36F. The layers of insulation 67, 68, and 69 thereby define zones or volumes of thermal storage material, including an innermost zone that is primarily heated and cooled by manifold 42, an intermediate zone of thermal storage material 35 that is primarily heated and/or cooled by manifold 41, and an outer zone that is primarily heated/or cooled by the manifold 40. It will be understood that, if additional manifolds are utilized, additional layers of insulation may be utilized to form additional zones that are thermally isolated from adjacent zones by the insulating material.

Referring again to FIG. 3, valve unit 9 may be connected to manifolds 54 and 55 to provide for control of fluid to the manifolds 40, 41, and 42 of thermal energy storage unit 5. Although the complete system is not shown in FIG. 3, valve unit 9 may be fluidly and/or operably connected to units 2, 6, 8 and controller 20 as shown in FIGS. 1 and 2. Manifold 54 is connected to valve unit 9 by a pipe or conduit 62, and provides for flow of fluid in the direction of the arrow "A" from valve unit 9 to the manifolds 40, 41, and 42. Manifold 55 is connected to the valve unit 9 by a pipe or conduit 63, and provides for flow of fluid from the manifolds 40, 41, and 42 to the valve unit 9 in the direction of the arrow B. Pipes 10A, 10B, and 10C are operably connected to the manifold 54 by valves 56, 57, and 58, respectively. Similarly, pipes 14A, 14B, and 14C are operably connected to the manifold 55 by valves 59, 60, and 61, respectively. The valves 56-61 are operably connected to controller 20.

In operation, if thermal energy from solar collector system 2 is to be stored in thermal energy storage unit 5, hot fluid (e.g., oil) from fluid conduits 28 of solar collectors 2A-2C flows to the valve unit 9 through conduits 14A-14C (FIG. 2) and into manifold 54. If the thermal storage medium 35 is relatively cool, the valve 58 can be open, while valves 56 and 57 remain closed, such that all of the hot fluid is directed to the innermost manifold 42, thereby heating the thermal storage material 35 in a first zone 64A in the vicinity of the pipes 36D. One or more temperature sensors 64 may be positioned in the thermal storage material 35 adjacent the pipes 36D that are connected to manifold 42. Similarly, one or more temperature sensors 65 and 66 may be positioned adjacent the pipes 36E and 36F that are connected to manifolds 40 and 41, respectively. The temperature sensors 64-66 may be operably connected to the controller 20. Storage material 35 adjacent temperature sensors 64, 65, and 66 define first, second, and third zones 64A, 65A, and 66A, respectively. Although some heat transfer between zones 64A, 65A, and 66A may occur, the temperature of zone 64A is primarily controlled by flow of fluid (thermal energy) through center manifold 42. Similarly, the temperature of zone 65A is primarily controlled by flow of heat-transferring fluid through manifold 41, and the temperature of zone 66A is primarily controlled by flow of heat-transferring fluid through manifold 40. In the illustrated example, thermal energy storage unit 5 includes three zones. However, thermal energy storage unit 5 may include one or two zones, or it may include four or more zones, depending on the requirements of a particular installation. Also, it will be understood that some zones of thermal energy storage unit 5 may not be used under some operating conditions. For example, if solar collector system 2 generates a relatively low amount of thermal energy during a 24 hour cycle due to cloud cover and/or low ambient temperature, all of collector system 2 may be routed to innermost manifold 42 to thereby transfer all of the thermal energy from solar collector system 2 to first zone 64A during a given twenty-four hour cycle.

In operation, if controller 20 determines that the thermal storage material 35 adjacent the pipes 36D is sufficiently heated (e.g. temperature sensor 64 indicates that the thermal storage material 35 is at or near the temperature of the fluid flowing into manifold 42), controller 20 closes valves 58 and 61, and controller 20 opens valves 57 and 60 to thereby provide for flow of heated fluid to the ring manifold 41. Once the temperature sensor 65 indicates that the thermal storage material 35 adjacent the pipes 36E is at or near the temperature of the fluid flowing into manifold 41, controller 20 closes valves 57 and 60 and opens valves 56 and 59 to heat the thermal storage material 35 adjacent the pipes 36F that are connected to the manifold 40. In this way, if thermal energy is being transferred to the thermal storage material 35, the centermost thermal storage material 35 can be heated first, followed by heating of thermal storage material 35 of zone 65A that is further away from the centermost pipe 36C. This process can be repeated for each zone of thermal energy storage unit 5.

To extract heat from the thermal storage material 35, the process can be "reversed". Specifically, cool fluid (e.g. 250° F.) is first directed to the outermost ring manifold 40 by opening valves 56 and 59, until the temperature sensor 56 indicates that the thermal storage material 35 adjacent the pipes 36F has been cooled to a predefined level (e.g. 250° F.). The valves 56 and 59 can then be closed, and the valves 57 and 60 can then be opened, until the temperature sensor 65 determines that the thermal storage material 35 adjacent the pipes 36E has been cooled to a predefined temperature (e.g. 250° F.). Finally, the valves 57 and 60 can be closed, and valves 60 and 61 are opened to thereby direct the cool fluid to the centermost manifold 42, until the temperature 64 indicates that the thermal storage material 35 adjacent the pipes 36D has cooled to a predefined level (e.g. 250° F.). It will be understood that additional manifold rings, valves, and temperature sensors may be utilized if required for a particular application, and the heating and cooling operation described above can be utilized in substantially the same manner for the additional manifolds and pipes.

Because thermal storage material 35 is not a liquid or gas, significant heat transfer due to convection between zones 54A-66A does not occur. In contrast, if a large tank of fluid (e.g. oil) were to be used as the energy storage medium, all of the fluid in the tank will tend to be at the same temperature due to convection of fluid within the tank. The solid thermal storage material 35 of thermal storage unit 5 may be selected to have relatively low heat transfer capabilities to thereby maintain significant temperature differences between zones 64A-66A during typical operating cycles of system 1. For example, system 1 may be configured to operate on twenty-four hour cycles combined with longer cycles of one to four weeks. In this type of application, system 1 stores thermal energy in unit 5 as it is generated by solar collection system 2 during the day, and used by unit 6 at night on an as-needed basis. During periods of warmer weather lasting several days or weeks, the total thermal energy stored in unit 5 will increase, even if some thermal energy is consumed by unit 6 on at least some nights during the period of warmer weather. Thus, a period of net thermal energy increase in the system could extend for several days, one or more weeks, or for several months. If the total amount of thermal energy consumed by unit 6 during one or more twenty-four hour periods exceeds the thermal energy production of unit 2, system 1 enters a phase or portion of a longer cycle during which the net thermal energy of the system is negative. The length of time periods during which net thermal energy increases or decreases may vary depending on local weather conditions, energy consumption needs of unit 6, and the like.

System 1 may be configured to provide adequate energy storage and retrieval capabilities for specific applications. For example, if it is known that a particular application will have numerous twenty-four hour cycles during which thermal energy production by unit 2 is not equal to thermal energy usage by unit 6, coupled with longer cycles lasting from several days to several weeks during which the net thermal energy of system 1 is significantly positive or negative, unit 5 may be configured to provide adequate thermal storage capacity at temperatures that provide significant efficiencies. If system 1 is configured to provide thermal energy storage over a cycle including a period of net thermal energy loss of ten days, unit 5 may be configured to maintain significant temperature differences between zones 64A-64C, etc.

If unit 6 requires heated oil that is at or above a specified temperature (e.g. the boiling point of water), zones 64A-64C can be configured to provide oil at the required temperature, even if the total thermal energy produced during a preceding period of positive net thermal energy production is not sufficient to heat all of the thermal storage material 35 to the required temperature. For example, unit 6 may include one or more devices that utilize steam to power mechanical devices and/or to generate electrical power. System 1 may be configured to initially heat a first zone 64A to 450° F. during periods of net thermal energy gain, followed by heating of zone 6413 to a temperature (e.g. 350° F.) that is less than the temperature of first zone 64A. As discussed above, after the oil passes through zone 64B, it will still retain significant thermal energy relative to an ambient temperature (e.g. 50°-90° F.), and the oil can be routed through additional zones 64C, etc. until the oil is at or near ambient temperature. In the instant example, if zone 64C is at 250° F., and a zone 64D is at 180° F., only oil from zones 64A-64C can be utilized by unit 6 to generate steam. Unit 5 may be configured such that one or more zones 64A-64C stay above the boiling temperature of water during a typical period (e.g. ten days) of net negative thermal energy experienced by system 1. Unit 5 is preferably configured such that heat transfer due to conduction between zones 64A-64C, etc. is sufficiently low to prevent equalization of temperatures of the zones in a manner that would otherwise cause the maximum temperature of the hottest zone of unit 5 to fall below a specified minimum required temperature.

Also, reducing or preventing heat transfer between zones 64A-64C of unit 5 also improves the efficiency of system 1 under some operating conditions. For example, if unit 5 included a single zone, unit 5 could not store additional thermal energy produced by solar units 2 whenever the temperature of the single zone of unit 5 exceeded the temperature of oil exiting solar units 2. If oil exiting solar units 2 is at, for example, 350° F., the oil has significant thermal energy relative to an ambient temperature of, for example, 70° F. However, if unit 5 had a single zone at a temperature of, for example, 400° F., thermal energy from the oil could not be transferred to unit 5.

Figure 6:
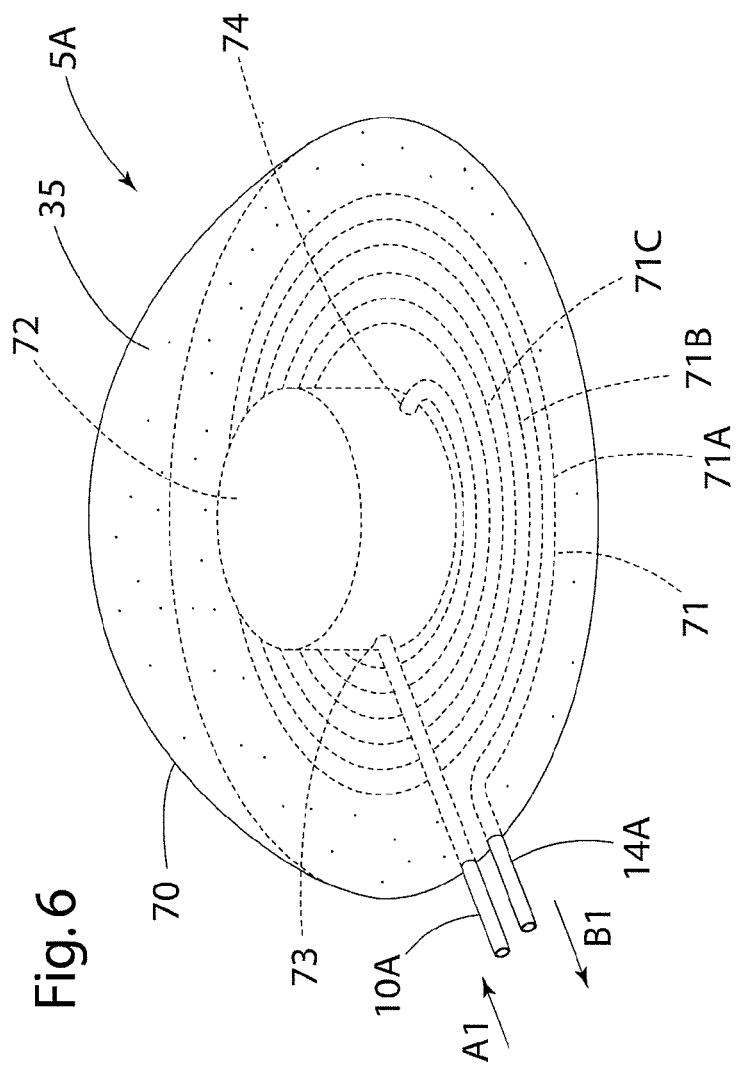
FIG. 6 is an isometric view of a thermal energy storage system according to another aspect of the present invention.

With further reference to FIG. 6, a thermal energy storage unit 5A according to another aspect of the present invention comprises thermal storage material 35 that is configured to form a dome 70. A pipe or conduit 10A is connected to tank 72 at an inlet 73 to provide for fluid flow in the direction of the arrow A1 into a tank 72. Pipe 14A is connected to tank 72 at outlet 74, and forms a coil 71 having a plurality of rings 71A-71C that are buried inside the thermal storage material 35. The tank 72 is optional, and the pipes 10A and 14A could be directly interconnected adjacent the center of the coils 71, rather than being connected to the tank 72. The hot or cold fluid flowing in the direction of the arrow A1 in pipe 10A first flows into tank 72 at inlet 73, and the fluid then flows through the exit 74, and around the coils 71A-71C. If the fluid in pipe 10A is hotter than the thermal storage material 35, the heat will be transferred from the fluid to the thermal storage material 35 from the coils 71A-71C, and from tank 72. Also, the tank 72 provides a short term "buffer", such that the fluid in the coils 71A-71C is typically not as hot as the fluid entering pipe 10A if thermal energy is being transferred to the thermal energy storage unit 5A. Alternately, if energy is being extracted from the thermal energy storage unit 5A, the fluid entering pipe WA in the direction of the arrow A1 will be cooler than the thermal storage material 35, and the fluid is heated as it passes into the tank 72, and through the coils 71A-71C, such that the fluid exiting thermal storage unit 5A at pipe 14A in the direction of the arrow B1 is substantially greater in temperature than the fluid entering pipe 10A.

With further reference to FIG. 7, a thermal energy storage unit 5B according to another aspect of the present invention includes an optional tank 72 that holds fluid 78. The tank 72 is buried in thermal storage material 35 having the shape of a dome 70. A plurality of fluid inlet pipes 10A-10F form a series of coils 71A-71C, 83A-83C, etc., and a plurality of outlet pipes 14A-14F are connected to the coils surrounding the tank 72. Each of the coils 71 and 79-83 may be connected to the tank 72 in substantially the same manner as the coil 71 described in more detail above in connection with FIG. 6. Also, each of the inlet pipes 10A-10F and outlet pipes 14A-14F may be selectively controlled in substantially the same manner as described in more detail above in connection with the manifolds 40, 41, and 42 shown in FIG. 3.

Although system 1 could be configured to operate at various temperatures, in many applications the coolest zone in thermal energy storage unit will typically be at or above about 250° F. after system 1 has been in operation for a period of time. (The coolest zone of unit 5 will normally be about equal to the ambient temperature when systeml is first actuated after initial installation or after a period of non-use.) Depending upon the amount of solar energy available and other operating conditions, the fluid (e.g. oil) exiting solar collector system 2 may be at least about 450° F. or more (e.g. 500° F.). Higher fluid operating temperatures in solar collector system 2 generally provide for greater heat transfer from the solar collector system 2 to thermal energy storage unit 5. However, if system 1 utilizes oil as the heat-transferring fluid, maximum temperatures of about 450° F. are presently preferred to avoid excessively rapid breakdown of the oil. System 1 may be configured to provide lower maximum fluid temperatures such as, for example, 425° F. or 400° F. if longer life of the heat-transferring fluid (e.g. oil) is required for a particular application. One or more temperature sensors 75 and 76 (FIG. 2) may be utilized to measure the temperature of fluid entering and exiting, respectively, solar collector system 2. Also, system 1 may include temperature sensors 85 and 86 that measure the temperature of the heat-transferring fluid as it enters and exits, respectively, valve unit 9. Temperature sensors 75, 76, 85, 86 are operably connected to controller 20 to provide inputs concerning operating temperatures of the heat-transferring fluid at various points in the system. Also, one or more fluid flow sensors (not shown) and/or fluid pressure sensors (not shown) may be positioned at or adjacent the locations of temperature sensors 75, 76, 85, 86 and/or other locations to provide additional input concerning operating parameters of the system. Also, controller 20 may be operably connected to a temperature sensor 87 that measures an ambient temperature to provide an additional input to controller 20.

As discussed above in connection with FIG. 1, the system 1 may include a source of thermal energy such as a solar collector system 2, a thermal energy storage unit 5, an energy-using facility 6, and it may also include an alternate or auxiliary heat unit 8, and each of these units are fluidly interconnected by a valve unit 9. System 1 may be operated in a number of modes depending upon the amount of thermal energy being developed by the solar collector system 2, the amount of heat being used by the energy-using facility 6, and other operating conditions.

For example, if the energy-using facility 6 is drawing little or no thermal energy from the system, and the solar collector system 2 is generating substantial thermal energy, and if the thermal energy storage unit 5 is relatively cool (e.g. 250° F.), controller 20 may be programmed to cause valve unit 9 to provide for flow of heated fluid (e.g. oil at 450° F.) from the hot side of the solar collector system 2 into the thermal energy storage unit 5. If the heated oil has a temperature that is greater than the highest temperature zone in the thermal energy storage unit 5, the heated oil is directed first into the centermost zone utilizing manifold 42 (FIG. 3). After passing through pipes 36D and manifold 42, the oil is then passed through the manifold 41 and pipes 36E, then through manifold 40 and pipes 36F until the oil is approximately the same temperature as the thermal storage material 35 adjacent the next coolest zone (manifold) in the system. When the temperature of the oil is the same or about the same (e.g. within 10° or 20° F.) as the coolest zone in the thermal energy storage unit 5, little or no heat transfer will occur, and there is no need to pump the oil through additional zones. After the cooled oil leaves the thermal energy storage unit 5, it is directed back to the cool side of the solar collector system 2, where it is re-heated, and then routed back to thermal storage unit 5 as just described.

If the heated oil from the solar collector system 2 is at a temperature that is lower than the highest temperature zone of the thermal energy storage unit 5, several operational modes are possible. First, the controller 20 and valve unit 9 can route the heated oil back through the solar collector system 2 to further heat the oil until it is at a higher temperature than the hottest zone of the thermal energy storage unit 5. Alternately, rather than further heating the oil in the solar collector system 2, the heated oil from the solar collector system 2 may be directed to a cooler zone of the thermal energy storage unit 5 (i.e. a zone in which the temperature is less than the temperature of the oil) to thereby heat the thermal storage material 35 in that zone. The oil can then be routed through successive outer/cooler zones until it is the same temperature or cooler than the coolest zone. In general, this mode of operation is only possible if the heated oil from solar collector system 2 has a temperature that is greater than the temperature of the coolest zone of the thermal energy storage unit 5.

If the oil from solar collector system 2 is at a lower temperature than the hottest zone of the thermal energy storage unit 5, controller 20 and valve unit 9 may be configured to direct oil from solar collector system 2 to the auxiliary heat source 8 for further heating to bring the temperature of the oil above the temperature of the hottest zone of the thermal energy storage unit 5. The heated oil can then be routed from auxiliary source 8 to the zones of the thermal energy storage unit 5 that are cooler than the heated oil, starting with the zone having the highest temperature that is still lower than that of the heated oil.

If the thermal energy storage unit 5 is relatively cool (e.g. all zones have a temperature of about 250° F. or less), the storage collector system 2 is generating little or no energy, but the auxiliary heat source 8 is generating significant thermal energy, the system may be configured to operate according to the scenarios or modes described above, except that the heated oil is routed to energy storage unit 5 from the auxiliary heat source 8 rather than from the solar collector system 2 by controller 20 and valve unit 9.

Also, system 1 may be configured to utilize the solar collector system 2 and the auxiliary heat source 8 in series. For example, heated oil from the solar collector system 2 may be directed into the inlet side of the auxiliary heat source 8 where the oil is heated to a higher temperature, and the heated oil from the auxiliary heat source 8 can then be routed to the thermal energy storage unit 5. The cool oil flowing from the thermal energy storage unit 5 can then be directed to the inlet side of the solar collector unit 2.

The operating modes described above may be utilized in situations where the energy-using facility 6 is not drawing thermal energy from the system. If the energy-using facility 6 is drawing thermal energy from the system, additional operating modes or scenarios may be utilized.

For example, if the thermal energy storage unit 5 is relatively cool (e.g. all zones are at 250° F. or lower), and heat is being supplied to the energy-using facility 6, heated oil from the solar collector system 2 can be directed from solar collector system 2 to the energy-using facility 6 by controller 20 and valve unit 9. Also, heated oil from the auxiliary heat source 8 may also be directed to the energy-using facility 6. Furthermore, controller 20 and valve unit 9 may simultaneously direct heated oil from both the solar collector system 2 and auxiliary heat source 8 to the energy-using facility 6 and thermal energy storage unit 5 if the thermal energy produced by the solar collector system 2 and/or auxiliary heat source 8 exceeds the thermal energy being used by the energy-using facility 6.

In general, thermal energy may be drawn from the thermal energy storage unit 5 by pumping cool oil (e.g. 250° F. or lower) into at least one zone of the thermal energy storage unit 5 that is at a higher temperature than the oil, so that the oil is heated to a higher temperature as it passes through pipes 36 of thermal energy storage unit 5. The oil can then be directed through progressively hotter zones of the thermal energy storage unit 5 until the oil achieves a desired temperature. The oil is then directed to the inlet (e.g. pipe 11) of the energy-using facility 6. The cool or outlet fluid is then directed in the direction of the arrow B2 through pipe 15 to the inlet (e.g. pipe 13) in the direction of the arrow A4 by the valve unit 9.

If the hot oil exiting the thermal energy storage unit 5 does not have a sufficiently high temperature, the oil may be directed to the auxiliary heat source 8 by the valve unit 9 for additional heating. The oil from the auxiliary heat source 8 may then be directed to the inlet (e.g. pipe 11) of the energy-using facility 6. The oil exiting the energy-using facility 6 is then directed to the thermal energy storage unit 5 for further heating.

Alternately, if the oil exiting the thermal storage unit 5 does not have sufficient temperature, and if the solar collector system 2 is generating substantial heat, oil exiting the thermal energy storage unit 5 may be directed to the solar collector system 2 for additional heating, and the hot oil may then be directed to the energy-using facility 6. The cooler oil from energy-using facility 6 may then be routed to the thermal energy storage unit 5 for heating.

If the heated oil or other fluid coming from the thermal energy storage unit 5 does not have a sufficiently high temperature to properly supply energy-using facility 6, the oil can be routed to the solar collector system 2 for additional heating as just described. If, however, the oil still does not have sufficiently high temperature after passing through the solar collector system 2, the oil may subsequently be directed to the auxiliary heat source 8 for additional heating. The fluid may then be directed to the energy-using facility 6. The cool oil (e.g. 250° F. or lower) or other fluid exiting the facility 6 may then be routed through the thermal energy storage unit 5, through the solar collector system 2, and through the auxiliary heat source 8 as just described.

If the solar collector system 2 by itself, or in combination with auxiliary heat source 8 are producing more heat than needed by the energy-using facility 6, heated oil or other fluid from the solar collector system 2 can be separately or in combination with auxiliary heat source 8, directed by valve unit 9 to facility 6, and surplus heated fluid can be directed by valve unit 9 to the thermal energy storage unit 5.

The thermal energy storage system described above provides a very cost-effective way to store thermal energy. The system provides for use and storage of thermal energy in a variety of modes or scenarios such that the thermal energy is stored and utilized in a very efficient manner.

Although oil is an example of a suitable fluid that may be utilized in the present system, water or other fluids may also be utilized. Also, the heat source 2 may comprise other sources of heat other than solar collectors. For example, the heat source 2 may comprise a known geothermal source wherein thermal energy is drawn from the earth.

Also, system 1 may include one or more units that generate electricity to supply energy-using facility 6. For example, system 1 may include one or more units that generate electricity from wind. System 1 may also include one or more units that utilize hot oil from solar collector system 2 and/or thermal energy storage unit 5 and/or alternate heat source 8 to generate steam that is utilized to generate electrical power. Wind and steam powered electrical power generating systems are commercially available, such that the details of such systems are not described in detail herein.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A thermal energy system, comprising:
    at least one source of thermal energy providing heated oil at a first temperature that is substantially greater than an ambient air temperature;
    at least one energy-consuming unit that consumes thermal energy transported to the energy-consuming unit by heated oil;
    at least one thermal energy storage unit having a thermal mass that selectively receives and releases thermal energy that is transported to and from the thermal mass by oil;
    a fluid conduit system fluidly interconnecting the source of thermal energy, the energy-consuming unit, and the thermal energy storage unit and providing flow of oil between the source of thermal energy, the energy-consuming unit and the thermal energy storage unit;
    a control system configured to control flow of oil through the fluid conduit system according to predefined criteria; and wherein
    the one thermal energy storage unit comprises a waterproof barrier defining an interior space, and including substantially loose solid material disposed in the interior space, and at least one fluid conduit extending through the loose solid material to transfer thermal energy from oil flowing through the at least one fluid conduit to the loose solid material.

2. The thermal energy system of claim 1, wherein:
at least some oil disposed in the one fluid conduit in the one thermal energy storage unit is at a temperature that is significantly greater than 212° F.

3. The thermal energy system of claim 1, wherein:
the loose solid material disposed in the interior space defines a first thermal mass, and oil disposed in the one fluid conduit in the interior space defines a second thermal mass, and wherein the second thermal mass is no more than 10% of the sum of the first and second thermal masses.

4. The thermal energy system of claim 3, wherein:
the second thermal mass is no more than 1% of the first and second thermal masses.

5. The thermal energy system of claim 1, wherein:
the loose solid material comprises sand.

6. The thermal energy system of claim 1, wherein:
the loose solid material comprises gravel.

7. The thermal energy system of claim 1, wherein:
the loose composite material comprises dirt.

8. The thermal energy system of claim 1, wherein:
the source of thermal energy comprises a plurality of solar collectors having elongated conduits carrying oil therethrough.

9. The thermal energy system of claim 1, wherein:
the one thermal energy storage unit has a sloped upper surface; and
wherein the source of thermal energy comprises a plurality of elongated solar collectors disposed on the sloped upper surface.

10. The thermal energy system of claim 1, wherein:
the source of thermal energy comprises a geothermal system.

11. The thermal energy system of claim 1, wherein:
the control system is configured to cause some heated oil from the source of thermal energy to flow to the energy-consuming unit while substantially simultaneously causing some heated oil from the source of thermal energy to flow to the thermal energy storage unit if an amount of thermal energy produced by the source of thermal energy exceeds an amount of thermal energy consumed by the energy-consuming unit.

12. The thermal energy system of claim 1, wherein:
the control system is configured to route heated oil from the source of thermal energy to the energy-consuming unit if predefined operating criteria exist.

13. The thermal energy system of claim 12, wherein:
the predefined operating criteria comprises a temperature of heated oil exiting the source of thermal energy at a predefined minimum temperature.

14. The thermal energy system of claim 1, wherein:
the loose solid material disposed in the interior space defines at least first and second zones and first and second temperatures corresponding to the first and second zones, respectively;
the one fluid conduit disposed in the interior space includes a first section of fluid conduit disposed in the first zone and fluidly connected to a first inlet port and a first outlet port;
the one fluid conduit disposed in the interior space further including a second section of fluid conduit disposed in the second zone and fluidly connected to a second inlet port and a second outlet port; and
wherein the control system controls flow of heated oil from the source of thermal energy through the first and second section of fluid conduit based, at least in part, on the first and second temperatures.

15. The thermal energy system of claim 14, including:
an insulating barrier comprising substantially solid material extending between the first and second zones and thermally isolating the first and second zones from each other.

16. The thermal energy system of claim 15, wherein:
the first and second zones comprise horizontally elongated volumes.

17. The thermal energy system of claim 16, wherein:
the first zone comprises a center zone and the second zone substantially surrounds the first zone.

18. The thermal energy system of claim 17, wherein:
the first zone has a generally cylindrical outer boundary, and the first section of fluid conduit comprises a plurality of generally parallel first tube sections; and
the second zone has cylindrical inner and outer boundaries and a plurality of generally parallel second tube sections disposed between the inner and outer boundaries.

19. The thermal energy system of claim 18, wherein:
the parallel first tube sections are spaced-apart from one another at approximately equal distances; and
the parallel second tube sections are spaced-apart from one another at approximately equal distances.

20. The thermal energy system of claim 18, including:
a first manifold having an inlet port and a plurality of outlet ports fluidly connected to the inlet port, wherein each outlet port is fluidly connected to a first end of each first tube section; and
a second manifold having an outlet port and a plurality of inlet ports fluidly connected to the outlet port, wherein each inlet port is fluidly connected to a second end of each first tube section.

21. The thermal energy system of claim 14, wherein:
in operation, the first and second zones define first and second temperatures, respectively, and wherein the first temperature is significantly greater than the second temperature and wherein the control system is configured to prevent the first temperature from exceeding a predefined maximum temperature of 450° F., and wherein the second temperature is at least about 250° F.

22. The thermal energy system of claim 14, wherein:
the control system is configured to direct flow of heated oil from the one source of thermal energy to at least one of the first and second zones only if a temperature of the at least one zone is less than a temperature of heated oil from the one source of thermal energy.

23. The thermal energy system of claim 22, wherein:
in operation, the first zone has a temperature that is significantly greater than a temperature of the second zone; and
the control system is configured to cause heated oil from the one source of thermal energy to flow through the second section of fluid and into the second zone if heated oil from the one source of thermal energy is at a temperature that is greater than a temperature of the second zone, but less than a temperature in the first zone.

24. The thermal energy system of claim 22, wherein:
in operation, the first zone has a temperature that is significantly greater than a temperature of the second zone; and
the control system is configured to direct oil to be heated for use by the energy-consuming unit to the second zone if a temperature of the oil to be heated is less than a temperature of the second zone.

25. The thermal energy system of claim 24, wherein:
the control system is configured to cause oil exiting the second zone to flow through the first zone if a temperature of oil exiting the second zone is less than a minimum temperature.

26. The thermal energy system of claim 25, including:
an auxiliary heat source that utilizes combustion to generate thermal energy; and
wherein the control system causes oil exiting the thermal energy storage unit to be further heated by the auxiliary heat source if a temperature of oil exiting the thermal energy storage unit is less than a minimum temperature.

27. The thermal energy system of claim 25, wherein:
the energy-consuming unit includes a generator that utilizes heated oil from the thermal energy storage unit to create steam that drive the generator to generate electricity.

28. The thermal energy system of claim 22, wherein:
the control system is configured to cause oil initially exiting the source of thermal energy to be recirculated back through the source of thermal energy if a temperature of oil initially exiting the source of thermal energy is less than a minimum temperature.

29. The thermal energy system of claim 22, wherein:
the loose solid material of the thermal energy storage unit further defines a third zone having a third section of fluid conduit disposed therein;
the control system is configured to cause heated oil from the source of thermal energy to flow through the first zone and be returned to the source of thermal energy without flowing through the second and third zones if first operating conditions occur;
the control system is configured to cause heated oil from the source of thermal energy to flow through the first and second zones before the oil is returned to the source of thermal energy if second operating conditions occur; and
the control system is configured to cause heated oil from the source of thermal energy to flow through the first, second, and third zones if third operating conditions occur.

30. The thermal energy system of claim 29, wherein:
the source of thermal energy comprises a solar collector.

31. The thermal energy system of claim 30, wherein:
the source of thermal energy further comprise a heater that utilizes combustion of fuel to generate heat.

32. A thermal energy storage unit, comprising:
a volume of substantially loose solid material, the volume defining first and second zones having first and second temperatures;
a first fluid conduit section disposed in the first zone, the first fluid conduit section having a first inlet and a first outlet;
a second fluid conduit section disposed in the second zone, the second fluid conduit section having a second inlet and a second outlet; and
a control system configured to control flow of fluid through the first and second fluid conduit sections based, at least in part, on the first and second temperatures, and wherein the control system is configured to cause fluids entering the thermal energy storage unit to flow through only a selected one of the first and second zones before exiting the thermal energy storage unit if predefined operating criteria are satisfied.

33. The thermal energy storage unit of claim 32, including:
oil disposed in at least one of the first and second fluid conduit sections.

34. The thermal energy storage unit of claim 33, including:
a solar collector fluidly connected to the first and second fluid conduit sections.

35. The thermal energy storage unit of claim 32, wherein:
the volume of substantially loose solid material is disposed inside a waterproof barrier.

36. The thermal energy storage unit of claim 35, including:
a layer of insulating material extending between the first and second zones.

37. The thermal energy storage unit of claim 32, wherein:
the control system is configured to cause fluid entering the thermal energy storage unit to flow through both the first and second zones.

* * * * *